United States Patent
Quaid

(10) Patent No.: US 6,985,745 B2
(45) Date of Patent: Jan. 10, 2006

(54) METHOD AND RADIO SIGNATURE POSITION DETERMINING ENTITY (RS-PDE) FOR MAINTAINING LOCATION DATABASE RELIABILITY

(75) Inventor: Geoffrey Quaid, Beaconsfield (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 49 days.

(21) Appl. No.: 10/303,098

(22) Filed: Nov. 25, 2002

(65) Prior Publication Data

US 2004/0203885 A1   Oct. 14, 2004

(51) Int. Cl.
*H04Q 7/20* (2006.01)

(52) U.S. Cl. ............................. 455/456.2; 455/456.1; 455/456.3; 455/456.4; 455/456.5; 455/456.6

(58) Field of Classification Search ............. 455/456.1, 455/456.2, 456.3, 456.4, 456.5, 456.6
See application file for complete search history.

(56) References Cited

U.S. PATENT DOCUMENTS 6,263,208 B1   7/2001   Chang et al. ............... 455/456
6,362,783 B1   3/2002   Sugiura et al. ............. 342/457
6,725,051 B2 *  4/2004   Fidler ....................... 455/456.1
6,757,545 B2 *  6/2004   Nowak et al. ........... 455/456.2

FOREIGN PATENT DOCUMENTS

WO         00/50918        12/2000

* cited by examiner

*Primary Examiner*—Nick Corsaro
*Assistant Examiner*—Yuwen Pan
(74) *Attorney, Agent, or Firm*—Ericsson Canada Inc.

(57) ABSTRACT

A method and a Radio Signature Positioning Determining Entity (RS-PDE) are provided for maintaining the reliability of a location database of the RS-PDE. A Data Transfer Scheduler (DTS) of the RS-PDE receives new location data comprising signal strength measurements records, and the new location data is correlated by a Data Correlation Device (DCD) with existing location data of the location database. The correlated location data is uploaded by a Data Uploader (DU) into the location database. A Data Performance Monitor (DPM) detects if the RS-PDE provides better positioning results using that correlated data, and if so, the RS-PDE then uses the correlated data for mobile station positioning. The location data update cycle may be triggered by a configurable timer defining an update periodicity, or by a detection of insufficient positioning accuracy of the RS-PDE using the existing location data.

13 Claims, 6 Drawing Sheets

METHOD AND RADIO SIGNATURE POSITION DETERMINING ENTITY (RS-PDE) FOR MAINTAINING LOCATION DATABASE RELIABILITY

BACKGROUND OF THE INVENTION

1. Field of the Invention

The present invention relates to Radio Signature Position Determining Entities (RS-PDEs) for mobile phones.

2. Description of the Related Art

Cellular telecommunications networks are well known systems that provide radio service to an ever-growing number of Mobile Stations (MSs) subscribers via a network of Base Stations (BSs), themselves connected to one or more switching nodes. Various types of cellular telecommunications networks exist, including but being not limited to the Time Division Multiple Access (TDMA) based ANSI-41 cellular networks, the Global System for Mobile communications (GSM) networks, the Code Division Multiple Access (CDMA) based networks, and the Third Generation (3G) cellular telecommunications networks (e.g. W-CDMA, CDMA2000, GSM-based EDGE).

In recent years, various countries around the world, including the United States, have introduced legislations governing mobile station location requirements for the wireless subscribers community. According to these requirements, in an emergency situation involving a mobile subscriber, the mobile station would have to be located by the cellular telecommunications network within a given distance, so that law enforcement agencies can use the location information to intervene more efficiently for solving the emergency situation.

Conversely, locating mobile subscribers is also useful for operators of the cellular telecommunications networks, which can use the mobile subscriber location information for providing location-based services to the mobile community, such as for example regional news, location-based information for various proximally located events, or even location-based advertisement for local businesses. There is therefore also an imperative commercial need for locating a mobile station as precisely as possible.

Various methods exist for locating a mobile station in a cellular telecommunications network. The most straightforward method involves including a GPS transceiver into the mobile stations, wherein the GPS transceiver registers the actual position of the mobile station in terms of latitude and longitude. In this implementation, the location information can be provided to the cellular network upon request, or on a regular basis, for both emergency situations and commercial purposes. However, the drawback of the GPS-based method for locating a mobile station is that only a limited portion of the active mobile stations currently comprises a GPS transceiver. Therefore, the GPS-based method does not fulfill the current needs of the cellular industry for locating every active mobile station of a network.

Another way for locating a mobile station is the so-called triangulation method that involves first measuring radio timing parameters of the signals from the mobile station at special listening receivers, typically collocated with three or more base stations, that simultaneously communicate with a central positioning processor. The processor derives the time differences for the received signal as measured at each receiver and then computes the position of the mobile station using a geometric triangulation. Many variants of the triangulation method exist, including some that use the received signal strength instead of the time of arrival parameter for the geometric triangulation. Although certain triangulation methods are relatively precise, the provisioning of large numbers of listening receivers and the requisite communication channels to the central processor translates into significant initial investments for the mobile network operators desiring to implement the triangulation method for locating their cellular subscribers.

Yet another method for locating mobile stations of a cellular telecommunications network is a Radio Signature Positioning System that involves the use of a Radio Signature Positioning Determining Entity (RS-PDE). A typical RS-PDE comprises a processor for computing the position of mobile stations using a positioning algorithm and an associated Radio Signature location database (RS-DB) that contains radio signature data records for all points on a grid that overlays the area of interest. An RS-PDE is used to locate a mobile station by comparing a series of signal strength measurements taken by the mobile station to be located with signal strength measurements stored in the RS-PDE, in order to determine the best match. The best matching record found in the location database of the RS-PDE is assumed to also comprise the current location of the mobile station. FIG. 1 (Prior Art) is an exemplary high-level illustration of such an RS-PDE 100 that comprises a virtual grid 101 that overlaps a physical cellular network 108, the grid 101 having a series of squares 103 which positions are represented by their respective center points. The grid point RS-PDE further comprises a grid point location database 102 where each position of a geographic point like the points 105 of the grid 101 is represented with a measured (and/or predicted, in some implementations) radio signal strength of radio communications that a mobile station receives from its current cell and from its neighboring cells, when the MS is located at a given position represented by that grid point. Typically, the grid point database is populated with radio data measured in the cellular network by a testing mobile station that roams in the area of interest and measures the received signal strength in every point of interest. For example, in the exemplary scenario of FIG. 1, three cells 112, 114, and 116 of the cellular network are represented with their corresponding base stations 118, 120, and 122, although it is understood that a typical cellular network may include a more significant number of cells. The base stations transmit control signals on their respective downlink Digital Control Channels (DCC) 124, 126, and 128. At the grid point location 104, a testing mobile station equipment 130 receives the radio signals on the DCCs 124, 126 and 128 and measures their signal strength levels at that precise location, which geographical coordinates are also recorded via, for example, GPS means. The data collected by the testing mobile station equipment 130 in the point 104, as well as from the other points of the grid, is used to populate the location database records like the exemplary database record 150. Thus, by multiplying the number of measurements performed by the testing equipment 130 at different grid point locations, the location database 102 is populated with multiple records 1–*m* showing the measured signal strength levels at each one of these multiple locations of the grid 101.

The exemplary location record 150 is shown in FIG. 1 as comprising a Mobile Switching Center Identity (MSC ID) 152 that provides the identity of the MSC servicing the service area where there radio signal strength measurements were registered, and a serving cell identity 154 providing the identity of the serving cell 112 used for the radio signal strength measurements. The location record 150 further comprises the actual position 156, in terms of latitude and longitude, that may have been measured using GPS means included in the testing mobile station equipment 130, and a series of n radio signal strength measurements 158 performed on the DCCs of the serving and neighboring cells of the cellular telecommunications network. For example, the parameter DCC_CH1_SS 158$_1$ may represent the received signal strength measured on the digital control channel of the serving cell 112, while the parameter DCC_CH2_SS 158$_2$ represents the signal strength measured on the digital control channel of a first cell 114 of n cells adjacent or geographically close to the serving cell 112. In order to have reliable measurements, the number n is typically selected between 6 and 12, thus allowing radio signal strength measurements to be done first on the serving cell, and further to 5–11 adjacent or closely located cells.

Once the location database 102 is populated with signal strength data for each grid point of the grid 101, a Mobile Positioning Center (MPC) 162 with access to the RS-PDE's processor 160 and to the location database 102 may find the location of any mobile station of the cellular network for responding to emergency situations as described hereinbefore, or simply for a commercial sake. The MPC 162 sends a series of D_CCs signal strength measurements taken by the mobile station to be located to the RS-PDE, where an RS-PDE Processor 162 compares these measurements with the records of the location database 102, for determining the best match. The best matching record found in the location database 102 is assumed to represent the current location of the mobile station, which is provided in terms of position information including the longitude and latitude parameters from the positioning field 206 of the best matching record 150.

The RSPDE is a reliable means for providing mobile station location information at reasonable costs for the network operator. However, the level of the radio signal strength data that is initially measured during the field test of the testing mobile station equipment 130 and that populates the database 102 forms the basis for the location algorithm. It was detected that over long periods of times the measured signal strength in a given location may vary due to i) the continue adjustments of the cellular network's topology (e.g. the cell definitions may be changed by the network operator to adapt to the changing traffic load), and to ii) seasonal and environmental changes (e.g. during the fall, trees of a forest lose their leaves thus changing the level of the measured signal strength in the area, an imposing building is constructed at the given location, etc). Since radio propagation conditions change with respect to the initial time where the testing equipment 130 collected the initial radio data, the mentioned factors introduce an error in the calculation of the position based on the signal strength, which negatively influence the performance of the grid point RS-PDE.

Although there is no prior art solution as the one proposed hereinafter for solving the above-mentioned deficiencies, the co-owned patent application entitled "Determination of Mobile Station Location", Ser. No. 10/095,958, filed in U.S. Patent and Trademark Office on Mar. 13, 2002 in the name of Gennady Bayder, hereinafter called Bayder bears some relation with the field present invention. Bayder teaches a system, method and processing unit for mobile station location determination. In Bayder, Mobile Assisted Handoff (MAHO) measurements are sent to a processing unit that also retrieves the corresponding transmitted signal strengths and electromagnetic field distribution functions for the relevant base stations. The location of the mobile station is then determined by minimising the following formula:

$$F(\gamma, x, y) = \sum_{j=1}^{m} M(P_{Rj} - \gamma \cdot P_{Tj} \cdot G_j(x, y))$$

where m is the number of relevant base stations, M is an optimisation metric (such as $(\epsilon_j)^2$ or $|\epsilon_j|$) $P_{Rj}$ is received signal strength, $P_{Tj}$ transmitted signal strength, $\gamma$ attenuation (e.g. in the mobile station), and $G_j(x,y)$ the electromagnetic field distribution function. Bayder's teaching is limited to a method and corresponding system for calculating a location of a mobile station using a specific algorithm defined by the above-mentioned formula, and therefore Bayder fails to teach or suggest any method or system for ensuring the consistency and the reliability of a grid point RS-PDE.

The co-owned patent application entitled "System and Method of Estimating the Position of a Mobile Terminal in a Radio Telecommunications Network", filed in U.S. Patent and Trademark Office on Jan. 10, 2002, in the names of Havish Koorapaty, Wang Wade, Zhu Guwei, and Panakanti Viswanath, hereinafter called Koorapaty, also bears some relation with the field of the present invention. Koorapaty teaches a system and method of estimating the position of a mobile terminal operating in a radio telecommunications network. Expected received signal strength values are predicted by a computer prediction tool, and/or are measured by a test mobile terminal from base station transceivers. The predicted and measured received signal strength values are then tagged to indicate whether each value was predicted or measured. The received signal strength values are then stored at a plurality of locations in a database. When the received signal strength measurements are received from the mobile terminal being located, a covariance matrix is used to compute metrics for the locations in the database. If more than a threshold percentage of the locations were populated with measured values, a maximum likelihood estimator is used to estimate the position of the mobile terminal. Otherwise, if fewer then a threshold percentage of locations were populated with measured values, a minimum mean square error estimator is used to estimate the position. Koorapaty is limited to teaching a system and method for estimating the position of the mobile terminal, and therefore fails to teach or suggest anything with relation to the reliability of the location data in a grid point RS-PDE.

Accordingly, it should be readily appreciated that in order to overcome the deficiencies and shortcomings of the existing RS-PDE implementations, it would be advantageous to have a simple yet efficient method and system for insuring the continuous reliability of the signal strength data that is used by a grid point RS-PDE system. The present invention provides such a method and system.

SUMMARY OF THE INVENTION

According to the present invention, a method and a Radio Signature Position Determining Entity (RS-PDE) are provided for maintaining the reliability of a location database of the RS-PDE. A Data Transfer Scheduler (DTS) of the RS-PDE receives new location data comprising signal strength measurements records, and the new location data is correlated by a Data Correlation Device (DCD) with existing location data of the location database. The correlated location data is uploaded by a Data Uploader (DU) into the location database. A Data Performance Monitor (DPM) detects if the RS-PDE provides better positioning results using that correlated data, and if so, the RS-PDE then uses the correlated data for mobile station positioning. The location data update cycle may be triggered by a configurable timer defining an update periodicity, or by a detection of insufficient positioning accuracy of the RS-PDE using the existing location data.

In one aspect, the present invention is a method for updating a location database of an RS-PDE, the method comprising the steps of transferring new location data to the RS-PDE, correlating the new location data with existing location data of the location database and creating correlated location data, and uploading the correlated location data into the location database.

In another aspect, the present invention is an RS-PDE including a location database comprising existing location data used for mobile station positioning; a Data Transfer Scheduler (DTS) receiving new location data; a Data Correlation Device (DCD) correlating the new location data with the existing location data of the location database and creating correlated location data; and a Data Uploader (DU) uploading the correlated data into the location database.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION OF THE PREFERRED EMBODIMENTS

Figure 1:
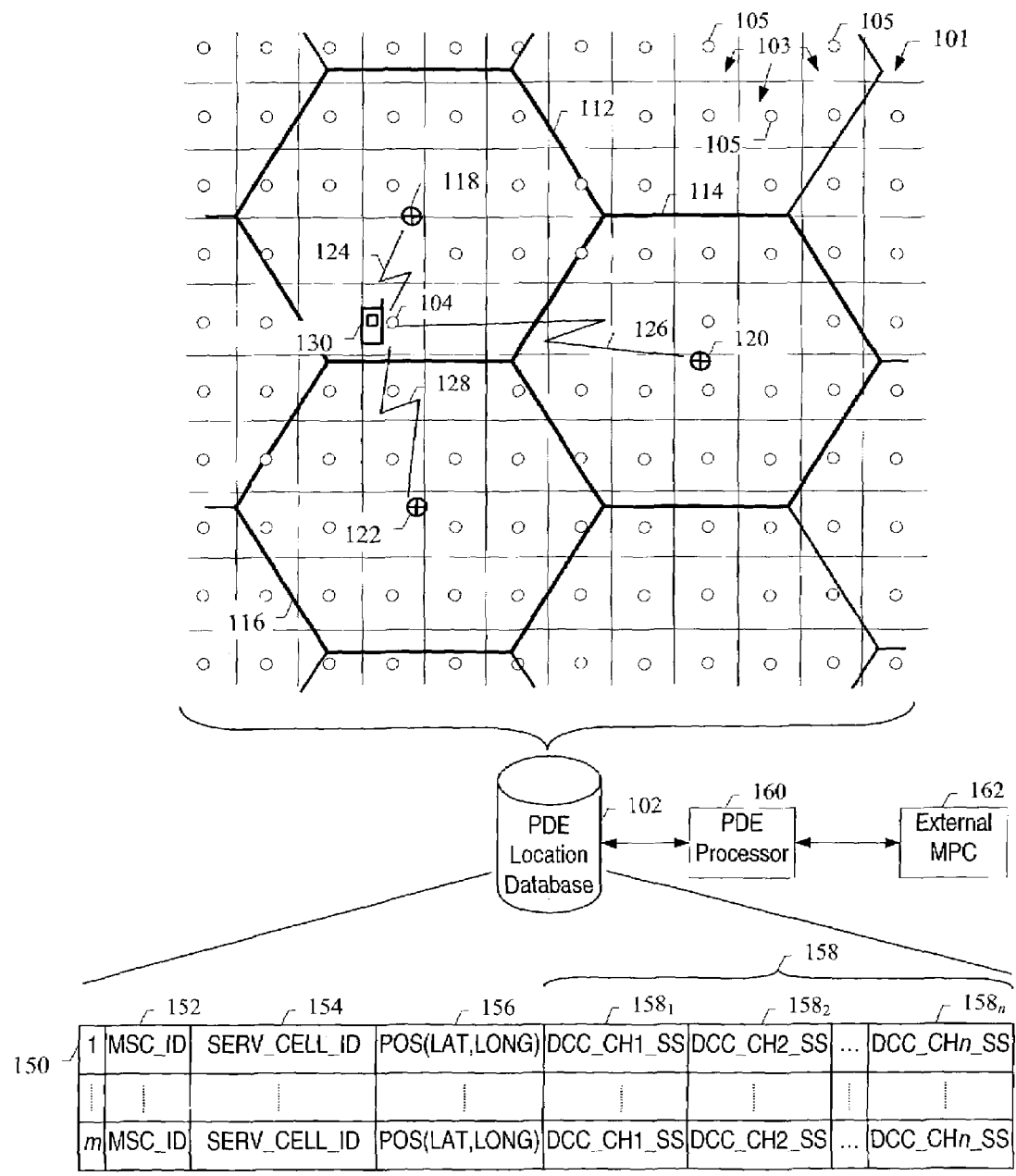
FIG. 1 (Prior Art) is an exemplary high-level illustration of a Radio Signature (RS) Positioning System that makes use of a Radio Signature Position Determining Entity (RS-PDE) for locating mobile stations of a cellular system.

The innovative teachings of the present invention will be described with particular reference to numerous exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views, and the various elements depicted are not necessarily drawn to scale.

According to the preferred embodiment of the present invention, there is provided a method and system for updating the location information of a location database of a Radio Signature Position Determining Entity (RS-PDE) once it is detected a triggering event. The triggering event may be, for example, when it is detected that the existing location information of the location database is no longer reliable enough, such as for example when the positioning performed using the location information of the RS-PDE is no longer sufficiently precise, or at the expiration of a timer defining a periodicity for the location database update. The invention provides several functional modules that are provided in an RS-PDE, modules which constitute an automated data integrity mechanism for the PDE. The invention allows for the download of new radio measurements data, also called herein radio signature location data, or simply location data, from an associated data collection system, and for the automated scheduling of all the involved processes required to maintain the radio signature location database performance of the RS-PDE. The invention further provides for the monitoring of the accuracy performance of the RS-PDE, for the analysis of the performance and for the initiation, when required, of a transfer of new measurements data into the RS-PDE location database in order to improve its accuracy. The invention further provides for a correlation of the new location data with the existing location data from the location database, in order to optimize the accuracy performance, as well as for means for validating the integrity of the updated location data.

Figure 2:
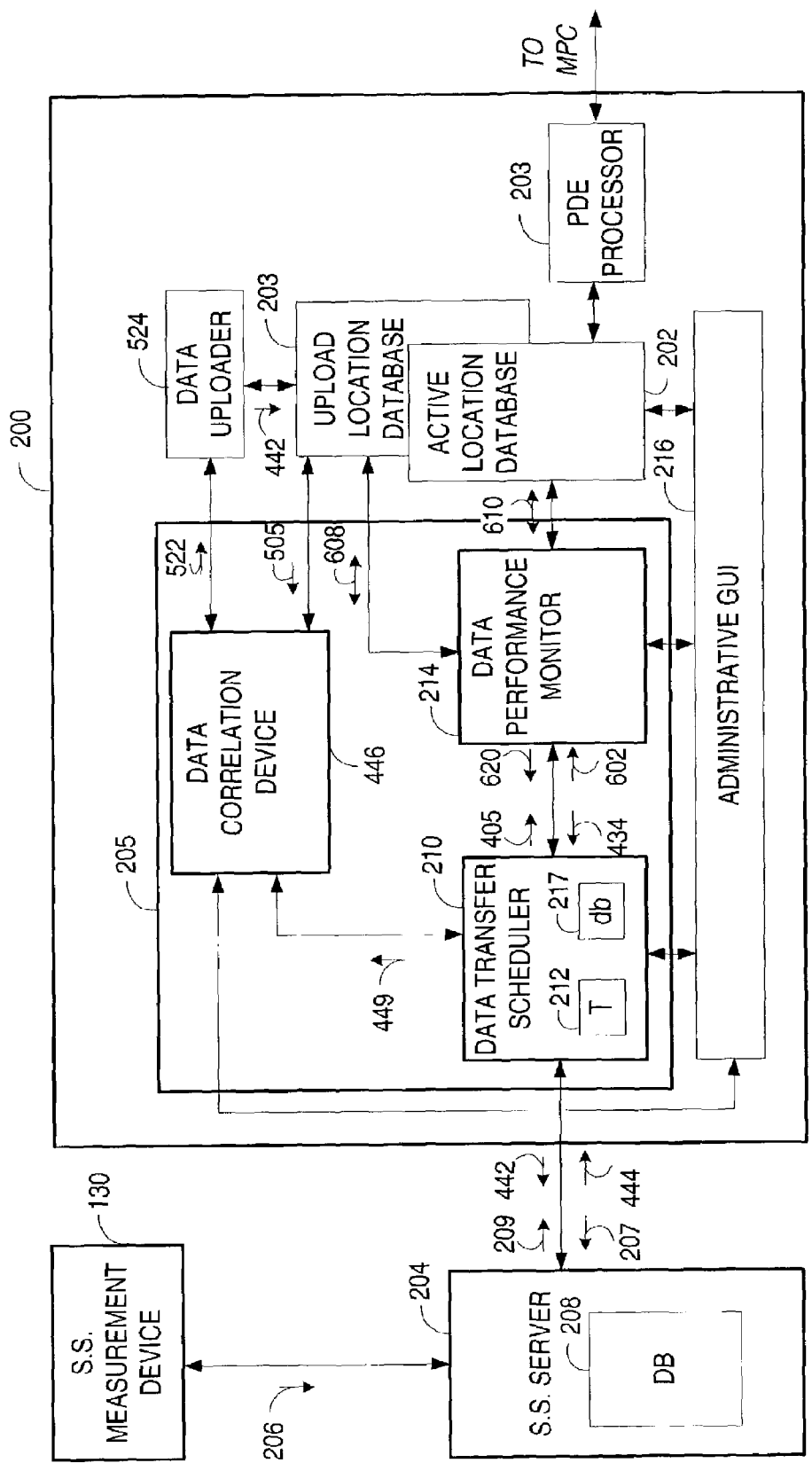
FIG. 2 is an exemplary high-level block diagram of an RS-PDE according the preferred embodiment of the present invention.

Referring now to FIG. 2, depicted therein is an exemplary high-level block diagram of an RS-PDE 200 implementing the preferred embodiment of the present invention. The RS-PDE 200 comprises an internal RS location database 202 for storing RS location data to be used for locating mobile phones, the location data being in the form of signal strength measurements records, such as for example alike the record 150 shown and described with relation to FIG. 1. The RS-PDE further comprises a processor 203 responsible for running an algorithm for processing location requests from the external Mobile Positioning Center (MPC, not shown) using the location information from the location database 202. The RS-PDE 200 has access to a Signal Strength (SS) measurements server 204 that receives signal strength measurements 206 collected by a mobile station testing equipment 130 during field tests in areas of interest of a cellular system (not shown). The signal strength measurements 206 may be stored by the S.S. server 204 in a location server database 208 in the form of location records like the location record 150 described hereinbefore.

According to the preferred embodiment of the present invention, the RS-PDE 200 is provided with an RS location database automatic update module 205 responsible for implementing the invention into the RS-PDE 200. The RS location database automatic update module 205 comprises a Data Transfer Scheduler (DTS) 210 which functions to control the transfer of new location data in the form of new radio measurements from the associated data collection server 204 into the RS-PDE 200, action 209. The DTS 210 may comprise a timer 212 responsible for triggering an update of the location database 202 at regular time intervals. The update of the location database 202 may be alternatively triggered by a decrease of the reliability of the location information stored in the RS location database 202, as detected by a Data Performance Monitor (DPM) 214 of the RS location database automatic update module 205, which function is yet to be described. The DTS 210 is also connected to administrative Graphical User Interface (GUI)

216 of the RS-PDE 200 that allows network administrators to configure the various components of the RS-PDE 200.

Figure 3:
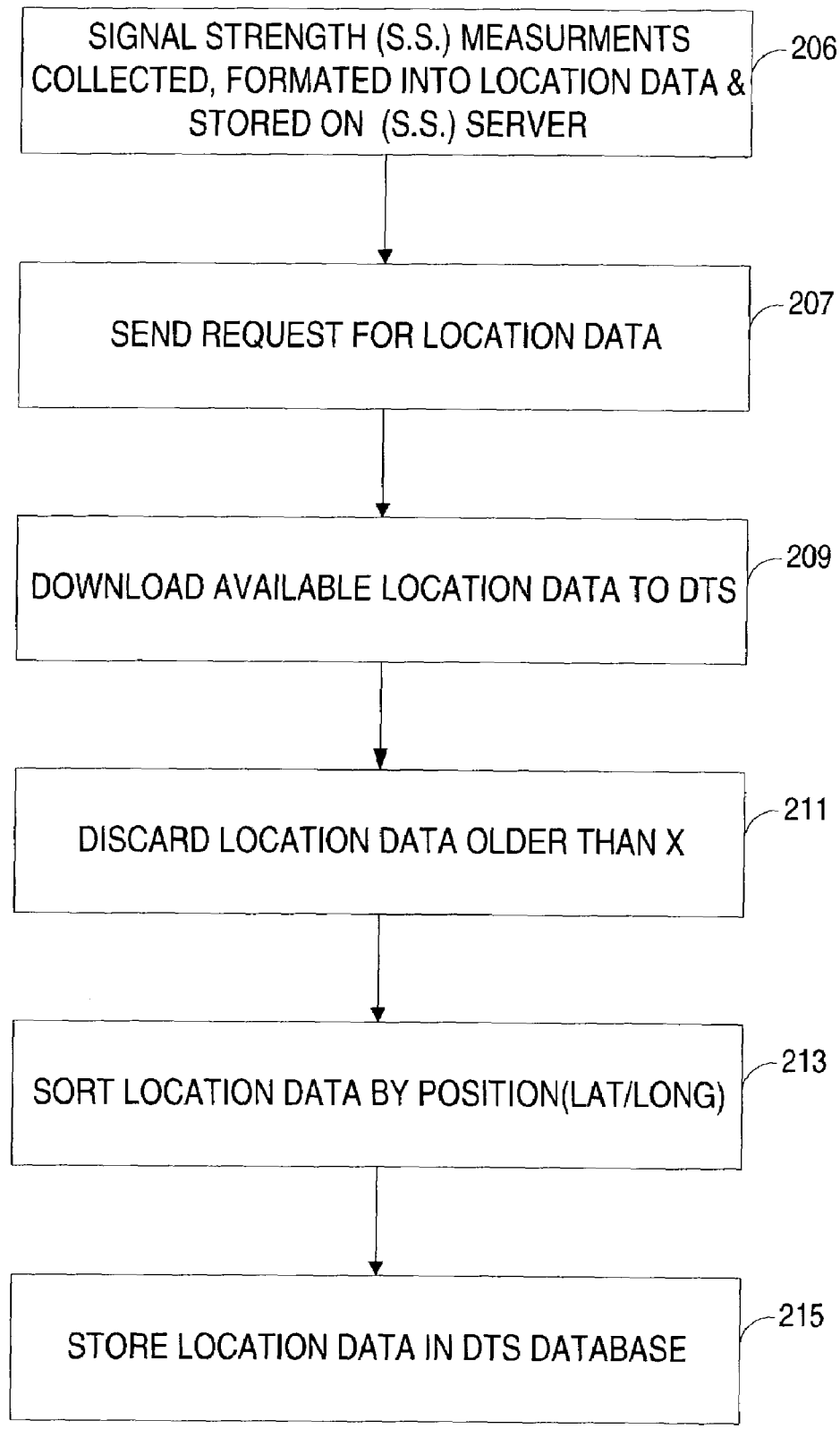
FIG. 3 is an exemplary flowchart diagram illustrative of the functioning of a Data Transfer Scheduler (DTS) of the RS-PDE according to the preferred embodiment of the present invention.

Reference is now made concurrently to FIG. 2, previously introduced, and to FIG. 3, which shows an exemplary flowchart diagram illustrative of the functioning of the DTS 210 when transferring new location data from the S.S. server 204 according to the preferred embodiment of the present invention. In action 206, new location data is collected and stored on the S.S. server 204 in the form of location data records like the record 150 of FIG. 1. The DTS 210 requests in action 207 new location data from the SS server 204 for a given Mobile Switching Center (MSC) service area. The purpose of requesting the new location data from the S.S. server 204 is to use that data for making a comparison with existing location data records of the location database 202 for determining the accuracy of a location computed based on the existing location records of the location database 202. The DTS 210 receives in action 209 preferably all the relevant location data available from the S.S. Server 204. In action 211, the DTS 210 may optionally discard the received location data that has timestamps older than a predefined number of days, so that only recent location data is used. Finally, in action 213, the DTS 210 sorts the newly received location data by position, and may temporarily store the sorted location data in a DTS database 217, action 215.

Figure 4:
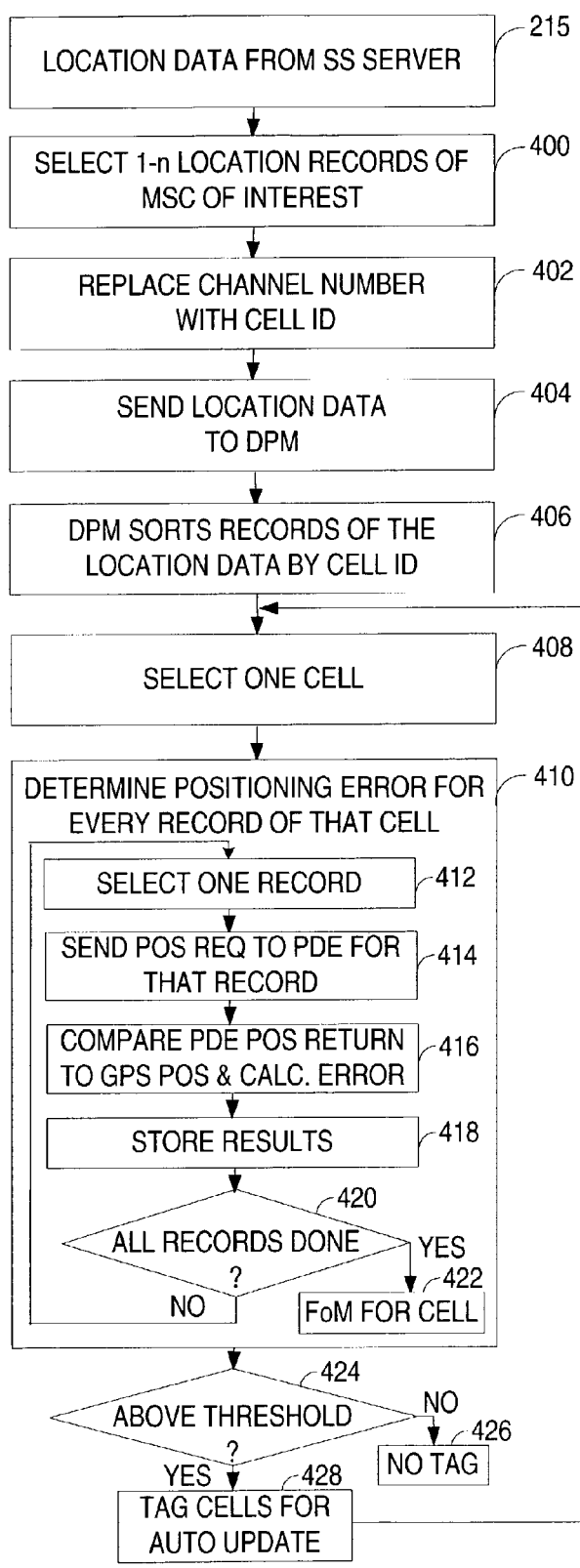
FIG. 4 is another exemplary flowchart diagram illustrative of the functioning of the RS-PDE according to the preferred embodiment of the present invention.
Figure 4:
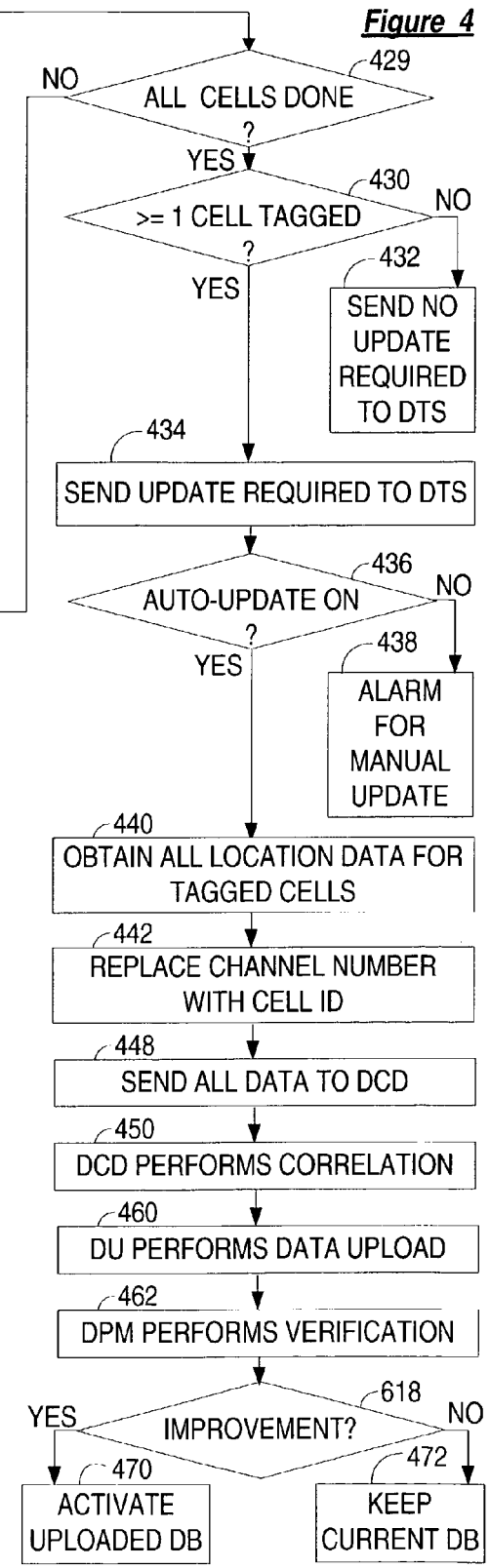

Reference is now made jointly to FIG. 2 and to FIG. 4, which is another exemplary flowchart diagram illustrative of the functioning of the RS-PDE 200 according to the preferred embodiment of the present invention. Once the DTS 210 has the new location data sample received in action 209, action 215, it may perform an optional sampling of the data 209 by, for example, randomly selecting one or more records from the location data sample, action 400. In action 402, the DTS 210 may replace the channel identity of each one of the selected records with their associated cell identity, in the case wherein the records received in the sample 209 have the field 154 (shown in FIG. 1) provisioned with the channel number information instead of the cell identity information. For example, in action 402, the DTS 210 may map a channel number 796 used by a given network operator to a serving cell identity XX0076, based on a mapping table (not shown) comprising an association between the channel numbers used by that network operator and the cell identities associated to these channel numbers. In action 404, the new location data sample 405 chosen in action 400 is sent from the DTS 210 to the DPM 214, which may first sort by cell ID the records of the sample 405, action 406. Then, the DPM 214 calculates, for each cell with location data records in the data sample 405, the performance of the current location database 202. For this purpose in action 408, the DPM 214 selects one cell of all the cells with location data records in the data sample 405, and in action 410 the DPM 214 computes a Figure of Merit (FoM) illustrative of the exactitude of the calculated positioning for the existing sampled records related to that cell. The determination of action 410 may comprise, first, the selection of a record from the sample, action 412, then the transmission, action 414, of a positioning request made to the RS-PDE database 202 on the basis of the radio measurements 158 (shown in FIG. 1) of the selected record, the return of the deducted position by the location database 202, the calculation of a difference between the deducted position and the actual geographical position considered to be the GPS-measured position provided by the field 156 of the sampled record, action 416, and the storage of the results, action 418. In action 420, it is detected if all records of the sample 405 have been processed and if not, the actions 412–418 are repeated for every one of these records. Finally, in action 422, a figure of merit is computed for the cell being analyzed. Action 422 may comprise, for example, the calculation of an average of the differences calculated for each one of the records as shown in action 416, or the $67^{th}$ better or worst percentile of the list of the differences calculated for the records in the same action 416.

The calculated FoM is representative of and/or proportional to the error on the positioning requests made to the active location database 202 in the area covered by the cell being analyzed. Once that figure of merit for that cell is calculated via the sequence of actions 410, in action 424 it is detected whether or not that figure of merit is above a pre-defined threshold and if not, the under consideration is not tagged for an automatic update of the location data, action 426. Otherwise, if figure of merit is above the threshold, in action 428, the DPM 214 tags that cell for an automatic update of its location data. In action 429, the DPM 214 detects if all cells for which location data records have been provided in the sample 405 are processed and if not, the actions 408–428 are repeated for every remaining cell. The DPM 214 further detects whether or not at least one cell is tagged for an automatic location data update, action 430, and if not, sends a no update required message to the DTS 210, action 432. Otherwise, if at least one cell is tagged for an automatic update of the location data, the DPM 214 sends an update-required message to the DTS 210, action 434. The DTS 210 may further detect in action 436 if the location data update feature is activated and if not, may issue an alarm notification informing the network administrator that a manual update of the location data is required, action 438. If the automatic update feature is activated, in action 440 the DTS 210 may request from the server 204 all the location data available for the cells that have been tagged for the automatic update, by issuing the request 442 and receiving, responsive to that request, the relevant data 444 comprising signal strength measurements records for the cells of interest. Again, in action 442, the DTS 210 may replace the channel number information with the cell identity information, if this is required and has not been previously done by the S.S. server 204. Then, the DTS 210 sends the location data 449 received in action 444 for the cells of interest to a Data Correlation Device (DCD) 446 of the RS location database automatic update module 205, action 448, which performs a correlation between the existing location data of the location database 202 and the new location data sent in action 448.

Figure 5:
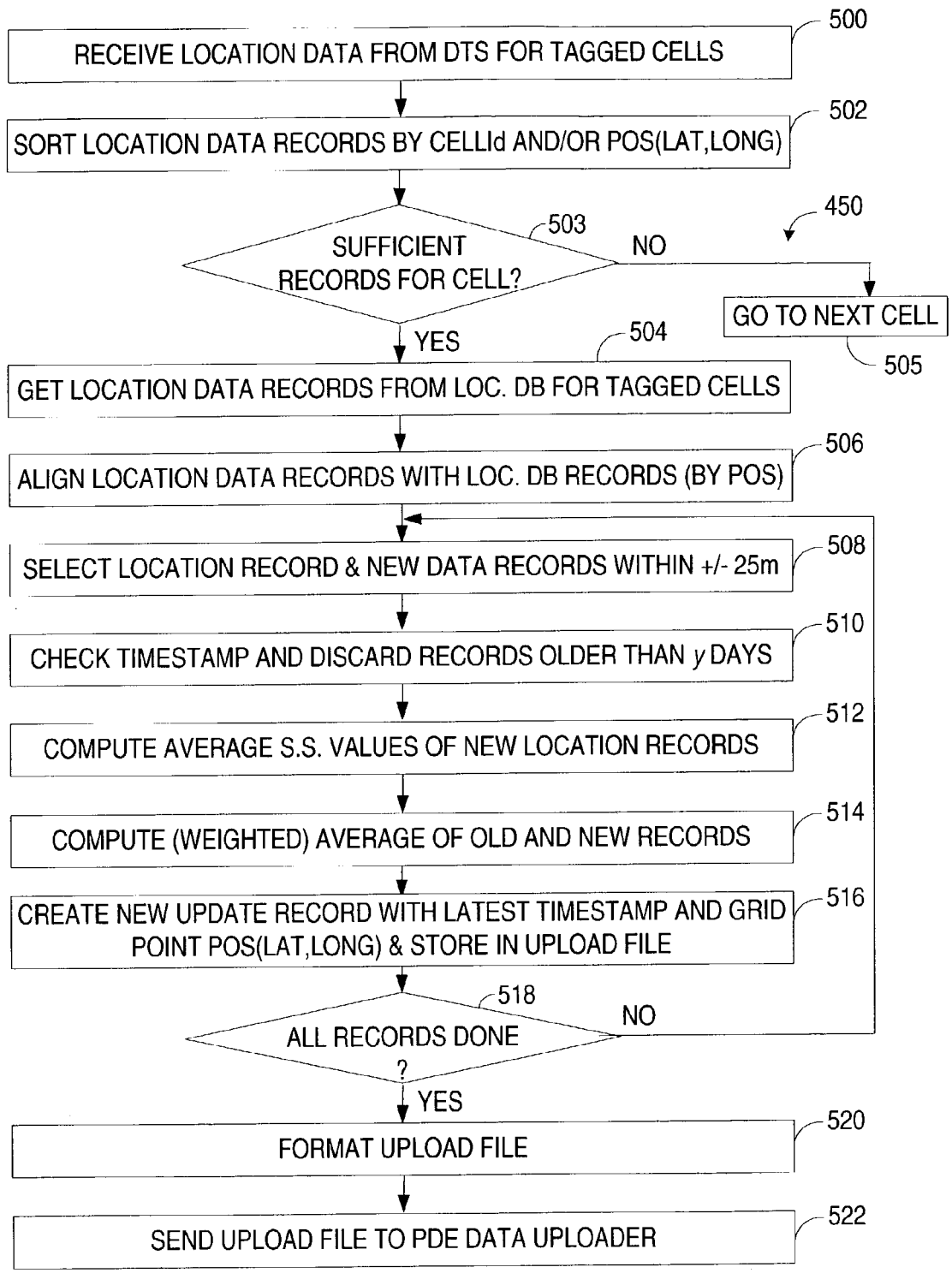
FIG. 5 is an exemplary flowchart diagram illustrative of the functioning of a Data Correlation Device (DCD) of the RS-PDE according to the preferred embodiment of the present invention.

Reference is now made to FIG. 5, which is an exemplary flowchart diagram illustrative of the functioning of the DCD 446 of the RS-PDE 200 according to the preferred embodiment of the present invention. FIG. 5 shows an exemplary correlation process 450 performed by the DCD 446 between the new location data and the existing location data of the database 202. The purpose of this correlation process is to take into consideration both the existing location data and new location data before updating the location database 202. This may be useful in various situations and implementation, such as for example when only a limited amount of new location data is available, or when a network operator prefers to gradually update the existing location data.

With reference to FIG. 5, when the location data update is triggered, such as detected in action 430 of FIG. 4 when at least one cell is tagged for an automatic location data update, the DCD 446 begins to correlate the old and the new location data for the tagged cells. When performing the correlation, the received location data 444 may be first sorted by location and timestamp and then correlated to the equivalent location data of the existing database records. The correlation may include associating those new records of the location data 444 with the current database 202 records, and ensuring that the record lengths are compatible. With reference being now concurrently made to FIG. 2 and FIG. 5, in action 500 the DCD 446 receives location data 449 for the cells tagged for the location data automatic update. In action 502, the DCD 446 sorts the records of the location data by cell identity (CellId), and by position. In action 503, the DCD 446 may insure that sufficient new location data records are available for each cell having location data records in the sorted list. If a cell is detected with insufficient records, it is considered that the new location data for that cell cannot positively influence the positioning related to that cell, and in action 505, that cell is discarded from consideration, its related data being discarded, and the method goes to treating the next cell. If sufficient data is available for the other cells from the sorted list, the DCD 446 further retrieves the existing location data records that correspond to the remaining tagged cells from the current RS-PDE location database 202, action 504, and in action 506, aligns the newly received location data records 449 with the location data records 505 from the location database 202. The alignment of the action 506 may be performed based on the position information comprised in each one of these records, so that the aligned records from the newly received location data and the existing location data of the database 202 have similar position information. In action 508, the DCD 446 selects a location data record from the location database 202 that represents a grid point of the grid 101 (shown in FIG. 1) as well as all the new location data records which position is within a given range of that grid point's location, such as for example ±25 m from the grid point. In action 510, the DCD 446 checks the timestamp and may optionally discard the newly received location data records that are older than a predefined number of days, so that only new location data is considered for the location data correlation. In action 512, the DCD 446 performs an average of the signal strength values of the remaining new location data records having position information within the given range, and further, in action 514 computes an average, or alternatively a weighted average, of the signal strength values of the selected existing record of the location database on one side, and the signal strength average value computed in action 512 on the other side. Finally, in action 516, the DCD 446 creates an updated location data record including the latest timestamp of the new location data, the signal strength values averaged in action 514, and the current position of the grid point under consideration. In action 518, the DCD 446 detects if all the grid points of interest for the tagged cells have been considered, and if not, repeats the actions 508–516 for each one of the remaining grid point. Otherwise, in action 520, the DCD 446 formats the correlated location data into a location data file to be uploaded in the RS-PDE location database, and sends that file to an RS-PDE Data Uploader (DU) 524, action 522.

Reference is now made back concomitantly to FIG. 2 and FIG. 4, wherein in action 460 the DU 524 performs an upload of the correlated location data into an upload RS location database 203. Further, in action 462, the DPM 214 is instructed to perform a verification of the correlated location data in order to ensure that location data uploaded into the upload RS location database 203 provides better positioning accuracy results than the old location data stored in the location database 202.

Figure 6:
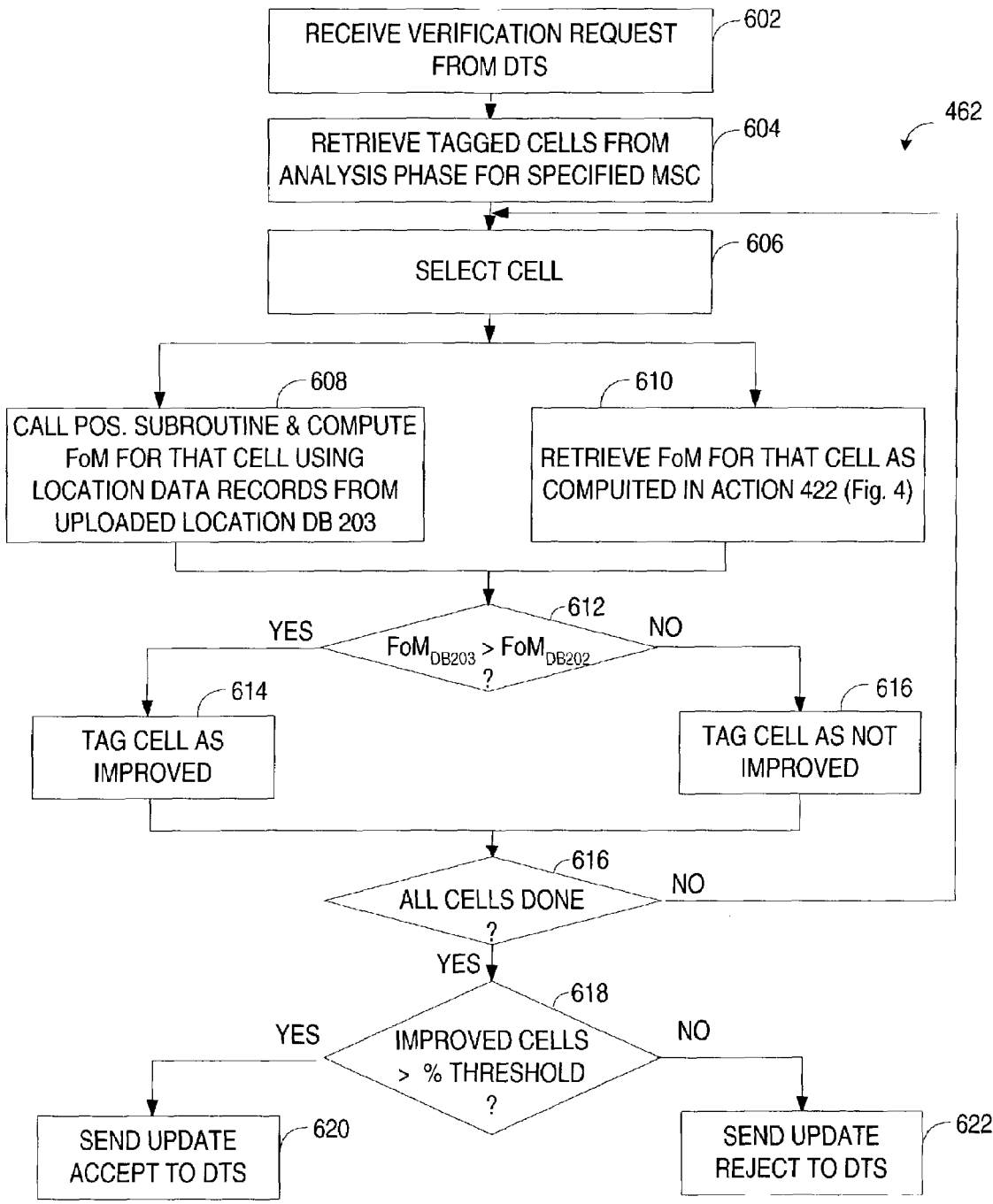
FIG. 6 is an exemplary flowchart diagram illustrative of the functioning of a Data Performance Monitor (DPM) of the RS-PDE according to the preferred embodiment of the present invention.

Reference is now made concurrently to FIG. 2 and FIG. 6 that shows an exemplary flowchart diagram representative of the verification process performed by the DPM 214 according to the preferred embodiment of the present invention. The shown verification process validates that the newly correlated location data allows the RS-PDE 200 to have improved positioning accuracy following the location data correlation. Once the correlated location data upload is performed, action 460, the DTS 210 transmits a request for verification message, action 602, to the DPM 214, the message also comprising the cells that were tagged for the automatic update. In action 606, the DPM 214 selects one cell of the tagged cells, and in action 608 invokes a positioning request subroutine similar to the one performed in action 410 shown in FIG. 4, wherein the positioning request subroutine computes a Figure of merit (FoM) for that cell using location data records from the uploaded location database 203. In action 610, the DPM 214 obtains the FoM for that same cell that was previously computed in action 422 of FIG. 4, which FoM is representative of the location accuracy provided by the RS-PDE using existing location data records from the active location database 202. In action 612, the two FoMs are compared. If the FoM computed using the correlated location data records form the database 203 is above the FoM computed using the old location data records from the database 202, then the cell under consideration is tagged as improved, action 614, since the FoM is representative of the positioning accuracy provided by the RS-PDE using a given set of data. Otherwise, in action 614, the cell under consideration is marked as not improved. In action 616, the DPM 214 further determines if all the tagged cells were processed, and if not, repeats steps 606–614 for each remaining cell. If all the tagged cells were processed, then in action 618 the DPM 214 further determines if more than a certain threshold percentage of the tagged cells have improved, and if so, sends an automatic update accept message to the DTS 210, the message being indicative of the acceptance of the location data correlation update. Otherwise, if fewer than the threshold number of cells have improved, it is considered that the correlated data is not more reliable than the existing location data of the database 202, and the DPM 214 sends an update reject message to the DTS 210, action 622.

Reference is now made back to FIG. 4, wherein following action 618, the DTS 210 instructs the activation of the upload location database 203 if an improvement is detected, action 470. Action 470 may comprise a replacement of the location database 202 by the upload location database 203, which becomes the active location database of the RS-PDE 200, thus completing the location data update according to the preferred embodiment of the present invention. Alternatively, the DTS 210 instructs the keeping of the currently active location database 202, action 472, if an improvement is not detected in action 618.

In a variant of the preferred embodiment of the invention, the timer 212 controls and trigger the location data update cycle. According to this variant, at regular time intervals defined by the timer T 212, itself controlled and configured by the administrative GUI 216, triggers the process of updating the location data of the location database 202. Thus, with reference being made to FIG. 4, actions 440–472 may be performed responsive to a timeout of the timer 202, thus allowing for a periodic RS location database update with new RS location data.

In yet another variant of the preferred embodiment of the invention, the verification process 462 illustrated in FIG. 6 may be skipped, so that once the location data update cycle is triggered by the timer 202 timeout or as described in relation to steps 400–436 of FIG. 4, the location database update takes place automatically without any further verification of the positioning accuracy of the newly correlated data.

In yet another variant preferred embodiment of the invention, the cells referred to in the foregoing description may not only represent a radio cell of the cellular telecommunication network under consideration, but any other area larger or smaller than a radio cell. Thus, the present invention allows a network operator to select a variable granularity of the areas under consideration for the RS location data update according to the present invention. For example, the cell referred to in the foregoing description may relate to a radio cell area, to a group of one or more radio cells, to a sub-cell area, or to any other sub-division of the cellular telecommunications network.

In yet another variant of the preferred embodiment of the invention, the RS location database automatic update module 205 shown in FIG. 2 as being included in the RS-PDE 200, may be external and only connected to the RS-PDE 200, although from a logical point of view, the functionalities provided according to the present invention can be viewed as being comprised in the RS-PDE.

Based upon the foregoing, it should now be apparent to those of ordinary skill in the art that the present invention provides an advantageous solution, which facilitates the maintenance of the RS-PDE location database reliability. Further, the invention provides for a method, system and RS-PDE that implements means for automatically detecting an event for performing a location data update, and means for carrying out the location data update when such event is detected (timer timeout or availability of new location data) means. Although the system and method of the present invention have been described in particular reference to certain exemplary actions for carrying out the invented concept, it should be realized upon reference hereto that the innovative teachings contained herein are not necessarily limited thereto, and may be implemented advantageously using different steps. It is believed that the operation and construction of the present invention will be apparent from the foregoing description. While the method and system shown and described have been characterized as being preferred, it will be readily apparent that various changes and modifications could be made therein without departing from the scope of the invention as defined by the claims set forth hereinbelow.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for updating a location database of a Radio Signature Positioning Determining Entity (RS-PDE), the method comprising the steps of:
   a) transferring new location data to the RS-PDE;
   b) correlating the new location data with existing location data of the location database and creating correlated location data;
   c) uploading the correlated location data into the location database;
   d) determining a Figure of Merit (FoM) for a cell associated with at least a portion of the new location data, the FoM relating to an exactitude of a positioning provided by the RS-PDE for positioning requests within the cell; and
   e) if the FoM for the cell is below a pre-defined threshold, tagging the cell for a location data automatic update; and
   wherein steps b) comprises correlating new location data associated to the cell with existing location data associated to the cell.

2. The method of claim 1 further comprising the step of:
   d) detecting an event triggering the method for updating the location database.

3. The method of claim 2, wherein the event is an expiry of a timer.

4. The method of claim 1, wherein the location data comprises location data records comprising a series of radio channel signal strength measurements.

5. The method of claim 1 further comprising the step of:
   f) verifying if the RS-PDE provides improved positioning accuracy using the correlated location data compared to using the existing location data; and
   g) if the RS-PDE has improved positioning accuracy using the correlated location data, activating the location database as the active location database of the RS-PDE.

6. The method claimed in claim 1, wherein between steps a) and b) the method comprises the step of:
   discarding the new location data that is older than a pre-defined period of time.

7. A Radio Signature Positioning Determining Entity (RS-PDE) comprising:
   a location database comprising existing location data used for mobile station positioning;
   a Data Transfer Scheduler (DTS) receiving new location data;
   a Data Correlation Device (DCD) correlating the new location data with the existing location data of the location database and creating correlated location data;
   a Data Uploader (DU) uploading the correlated data into the location database; and a Data Performance Monitor (DPM) that determines a Figure of Merit (FoM) for a cell associated with at least a portion of the new location data, the FoM being illustrative of an exactitude of a positioning provided by the RS-PDE for positioning requests within said cell, wherein the DPM tags said cell for a location data automatic update if the FoM is below a pre-defined threshold; and
   wherein the DCD correlates new location data associated to the cell with existing location data associated to the cell.

8. The RS-PDE of claim 7, wherein the DTS detects an event triggering an update of the location database, the update comprising a receipt of the new location data by the DTS, a correlation of the new location data with the existing location data by the DCD and an upload of the correlated data by the DU.

9. The RS-PDE of claim 8, wherein the DTS comprises a timer, and the event is an expiry of the timer.

10. The RS-PDE of claim 7, wherein the location data comprises location data records comprising a series of radio channel signal strength measurements.

11. The RS-PDE of claim 10, wherein the RS-PDE is connected to a Signal Strength (S.S.) Server, and wherein the DTS receives the new location data from the S.S. server.

12. The RS-PDE of claim 7, wherein:
the DPM verifies if the RS-PDE provides improved positioning accuracy using the correlated location data compared to using the existing location data, and if the RS-PDE provides improved positioning accuracy using the correlated location data, the DTS activates the location database as the active location database of the RS-PDE.

13. The RS-PDE of claim 7, wherein the DTS discards new location data that is older than a pre-defined period of time before the DCD correlates the new location data with the existing location data.

* * * * *